(12) United States Patent
Kang et al.

(10) Patent No.: US 12,434,775 B2
(45) Date of Patent: Oct. 7, 2025

(54) VEHICLE FRAME ASSEMBLY

(71) Applicants: HYUNDAI MOTOR COMPANY, Seoul (KR); KIA CORPORATION, Seoul (KR)

(72) Inventors: Seung Min Kang, Hwaseong-si (KR); Joo Nam Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 435 days.

(21) Appl. No.: 18/118,176

(22) Filed: Mar. 7, 2023

(65) Prior Publication Data

US 2024/0158019 A1 May 16, 2024

(30) Foreign Application Priority Data

Nov. 10, 2022 (KR) .................. 10-2022-0149846

(51) Int. Cl.
*B62D 27/02* (2006.01)
*B62D 21/03* (2006.01)
*B62D 21/15* (2006.01)

(52) U.S. Cl.
CPC ........... *B62D 27/023* (2013.01); *B62D 21/03* (2013.01); *B62D 21/155* (2013.01)

(58) Field of Classification Search
CPC .... B60Y 2306/01; B62D 21/02; B62D 21/03; B62D 21/152; B62D 21/155; B62D 24/00; B62D 25/08; B62D 25/082; B62D 27/023

See application file for complete search history.

(56) References Cited

U.S. PATENT DOCUMENTS

| | | | |
|---|---|---|---|
| 8,430,448 B2 | 4/2013 | Richardson et al. | |
| 8,752,884 B2 | 6/2014 | Hulett et al. | |
| 9,150,001 B2 | 10/2015 | Richardson et al. | |
| 9,782,950 B2 | 10/2017 | Richardson et al. | |
| 10,434,747 B2 | 10/2019 | Richardson et al. | |
| 11,331,877 B2 | 5/2022 | Richardson et al. | |
| 2010/0117397 A1 | 5/2010 | Richardson et al. | |
| 2011/0260501 A1* | 10/2011 | Faruque | B62D 25/085 296/187.03 |
| 2013/0248079 A1 | 9/2013 | Richardson et al. | |
| 2014/0237941 A1 | 8/2014 | Richardson et al. | |

(Continued)

FOREIGN PATENT DOCUMENTS

| | | | | |
|---|---|---|---|---|
| CN | 208813302 U | 5/2019 | | |
| DE | 202015001330 U1 * | 5/2016 | ............. | B62D 25/08 |

(Continued)

*Primary Examiner* — Lori Lyjak
(74) *Attorney, Agent, or Firm* — Lempia Summerfield Katz LLC

(57) ABSTRACT

A vehicle frame assembly includes a front cross member provided at the front of a cabin and extending in a widthwise direction of a vehicle, a front side member having one end connected to the front cross member and having another end extending rearwards of the front cross member, a fender member having one end connected to the front cross member and having another end extending outwardly upwards of the vehicle, and a connection joint connected to an end portion of the front cross member, having formed therein an inner space, and allowing the front cross member, the front side member, and the fender member to be interconnected in the inner space.

14 Claims, 8 Drawing Sheets

(56) References Cited

U.S. PATENT DOCUMENTS

| | | | |
|---|---|---|---|
| 2015/0344079 A1* | 12/2015 | Stojkovic | B62D 25/08 296/193.09 |
| 2016/0023435 A1 | 1/2016 | Richardson et al. | |
| 2018/0029328 A1 | 2/2018 | Richardson et al. | |
| 2020/0031093 A1 | 1/2020 | Richardson et al. | |
| 2022/0242091 A1 | 8/2022 | Richardson et al. | |

FOREIGN PATENT DOCUMENTS

| | | |
|---|---|---|
| JP | H05131953 A | 5/1993 |
| JP | 2012508141 A | 4/2012 |
| JP | 2013112160 A | 6/2013 |
| KR | 101866192 B1 | 6/2018 |
| KR | 20200009685 A | 1/2020 |
| KR | 20220010886 A | 1/2022 |
| KR | 20220077634 A | 6/2022 |

* cited by examiner

VEHICLE FRAME ASSEMBLY

CROSS-REFERENCE TO RELATED APPLICATION

This application claims priority to and the benefit of Korean Patent Application No. 10-2022-0149846, filed on Nov. 10, 2022, in the Korean Intellectual Property Office, the entire contents of which are incorporated herein by reference.

BACKGROUND

1. Field

The present disclosure relates to a vehicle frame assembly. More particularly, it relates to a vehicle frame assembly having a structure provided with a connection joint to improve connectivity between a chassis frame and members provided at the lower portion of the vehicle.

2. Description of the Related Art

Recently, a purpose built vehicle (PBV) has been introduced as a modular device having a simple structure that may be designed by reflecting various requirements at customer's desired time point. The PBV is an eco-friendly and multi-purpose vehicle that may be provided at a low cost. Accordingly, small quantity batch production of such a PBV is increasing.

The PBV has adopted a structure in which a vehicle body for various purposes based on a hailing/delivery characteristic is coupled to an upper portion of a chassis frame in order to secure passenger rideability and luggage loading convenience.

In order to couple the vehicle body to the upper portion of the chassis frame, the rigidity of a device configured to have the chassis frame mounted thereon is very important. To this end, it is common to connect members at the periphery of a mounting portion as much as possible, such as adding a bulkhead to the mounting portion or increasing the length welded to the members.

In the related art, because the connection among a front cross member, a front side member, and a fender member, which are the main members of the front of a vehicle, is made by flange coupling having weak rigidity or a difficult connection method is adopted between each of the members, $CO_2$ bonding is performed, resulting in thermal deformation and causing quality issues.

For this reason, a method of constructing a joint coupled to the front cross member, to the front side member, and to the fender member and capable of increasing the rigidity of the chassis frame is needed.

The information disclosed in this Background section is provided only to enhance understanding of the general background of the present disclosure, and should not be taken as an acknowledgement or any form of suggestion that this information forms the related art already known to a person of ordinary skill in the art.

SUMMARY

The present disclosure provides a vehicle frame assembly having a structure provided with a connection joint configured to interconnect a front cross member, a front side member, and a fender member to one another so as to improve connectivity between a chassis frame and each of the members provided at the lower portion of the vehicle, thereby increasing the rigidity of the chassis frame and each of the members.

The technical problems to be solved by the present disclosure are not limited to the technical problems described above, and other technical problems not described herein may be clearly understood by those having ordinary knowledge in the art from the description of the examples.

In accordance with an aspect of the present disclosure, a vehicle frame assembly includes: a front cross member provided at the front of a cabin and extending in a widthwise direction of a vehicle, a front side member having one end connected to the front cross member and having another end extending rearwards of the front cross member, a fender member having one end connected to the front cross member and having another end extending outwardly upwards of the vehicle, and a connection joint connected to an end portion of the front cross member. In particular, the connection joint is formed therein an inner space and allows the front cross member, the front side member, and the fender member to be interconnected in the inner space.

The vehicle frame assembly may further include a chassis frame provided at a lower portion of the vehicle and connected to the connection joint in a vertical direction so as to support the lower portion of the vehicle.

The connection joint may have a joint connecting portion downwardly extending therefrom, and the joint connecting portion may interconnect the connection joint and the chassis frame in the vertical direction.

The chassis frame may be mechanically coupled to the connection joint through the joint connecting portion.

The chassis frame may include a first frame vertically connected to the connection joint and extending to the lower portion of the vehicle, and a second frame connected to a lower end of the first frame and extending in the widthwise direction of the vehicle at the lower portion of the vehicle.

The first frame, the second frame, and the front cross member may define an annular structure at the front of the cabin.

An inner rib is provided in the inner space of the connection joint. The inner rib may be fixed to an inner surface forming the inner space and extend to a center of the inner space.

The inner rib may have a cross shape extending vertically in the inner space of the connection joint.

The front cross member, the front side member, and the fender member may be interconnected through the connection joint and share a load path in an event of a frontal collision of the vehicle.

The connection joint may have a coupling portion extending to and coupled with the front cross member, the front side member, and the fender member, respectively.

The inner space of the connection joint may have a closed cross-section, and the coupling portion may have an open cross-section, having one open side and the open side facing upwards.

The coupling portion may be brought into contact with a side end of the front cross member, a side end of the front side member, and a side end of the fender member. The coupling portion may have formed therein a seating groove so that the side ends are seated in the coupling portion.

The front cross member, the front side member, and the fender member may each have an end portion coupled to a coupling hole formed in the coupling portion.

The vehicle frame assembly may further include a plurality of reinforcing ribs, provided on an outer wall of the connection joint and configured to support the coupling portion in each direction where the front cross member, the front side member, and the fender member are coupled to the connection joint.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION

Figure 1:
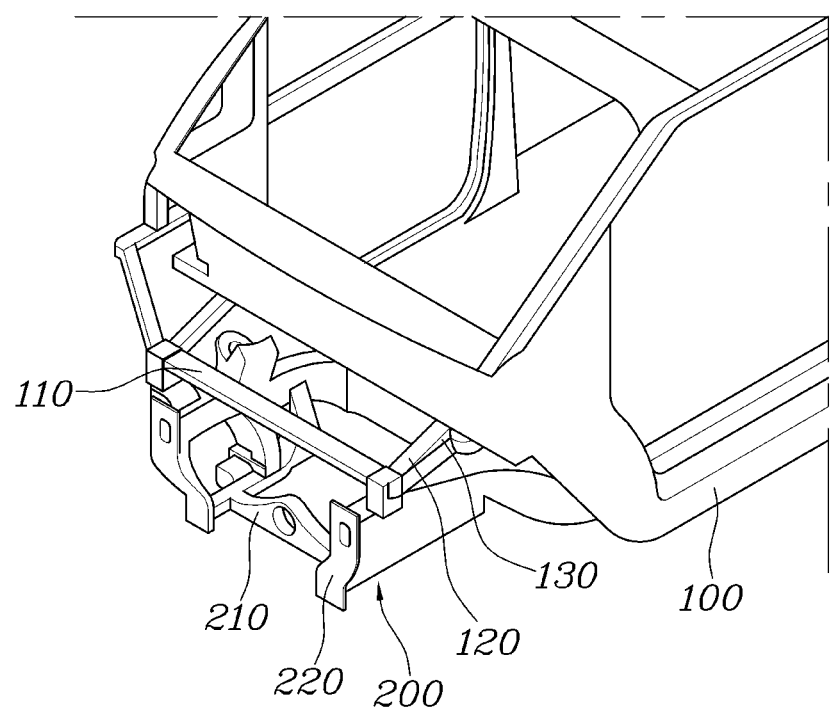
FIG. 1 is a view illustrating the structure of a vehicle frame assembly according to an embodiment of the present disclosure.

Hereinafter, embodiments of the present disclosure are described in detail with reference to the accompanying drawings, the same reference numerals are used to designate the same/like components, and a redundant description thereof has been omitted.

In general, suffixes such as "module" and "unit" may be used to refer to elements or components. Use of such a suffix herein is merely intended to facilitate description of the specification, and the suffix itself is not intended to have any special meaning or function.

In describing the present disclosure, if a detailed explanation of a related known function or construction is considered to unnecessarily obscure the gist of the present disclosure, such explanation has been omitted but would be understood by those skilled in the art. The accompanying drawings are used only to help easily explain the technical idea of the present disclosure, and it should be understood that the idea of the present disclosure is not limited by the accompanying drawings. The idea of the present disclosure should be construed to encompass any alterations, equivalents and substitutes beyond what is shown in the accompanying drawings. It should be understood that, although the terms first, second, etc. may be used herein to describe various elements, these elements should not be limited by these terms. These terms are generally only used to distinguish one element from another.

It should be understood that, when an element is referred to as being "connected to" another element, the element can be directly connected to the other element or intervening elements may also be present. In contrast, it should be understood that, when an element is referred to as being "directly connected to" another element, there are no intervening element present.

A singular representation may include a plural representation unless it represents a definitely different meaning from the context.

Terms such as "include" or "has" used herein should be understood as indicating the existence of several elements, functions or steps, disclosed in the specification, and it is also understood that greater or fewer elements, functions, or steps may likewise be utilized. When a component, device, element, or the like of the present disclosure is described as having a purpose or performing an operation, function, or the like, the component, device, or element should be considered herein as being "configured to" meet that purpose or to perform that operation or function.

According to an embodiment of the present disclosure, it is proposed to provide a connection joint configured to interconnect a front cross member, a front side member, and a fender member to one another, thereby improving connectivity between a chassis frame and each of the members provided at the lower portion of a vehicle.

FIG. 1 is a view illustrating the structure of a vehicle frame assembly according to an embodiment of the present disclosure. FIG. 1 mainly illustrates the components related to this embodiment. Of course, in realization of the vehicle frame assembly, fewer or more components may be included.

Figure 2:
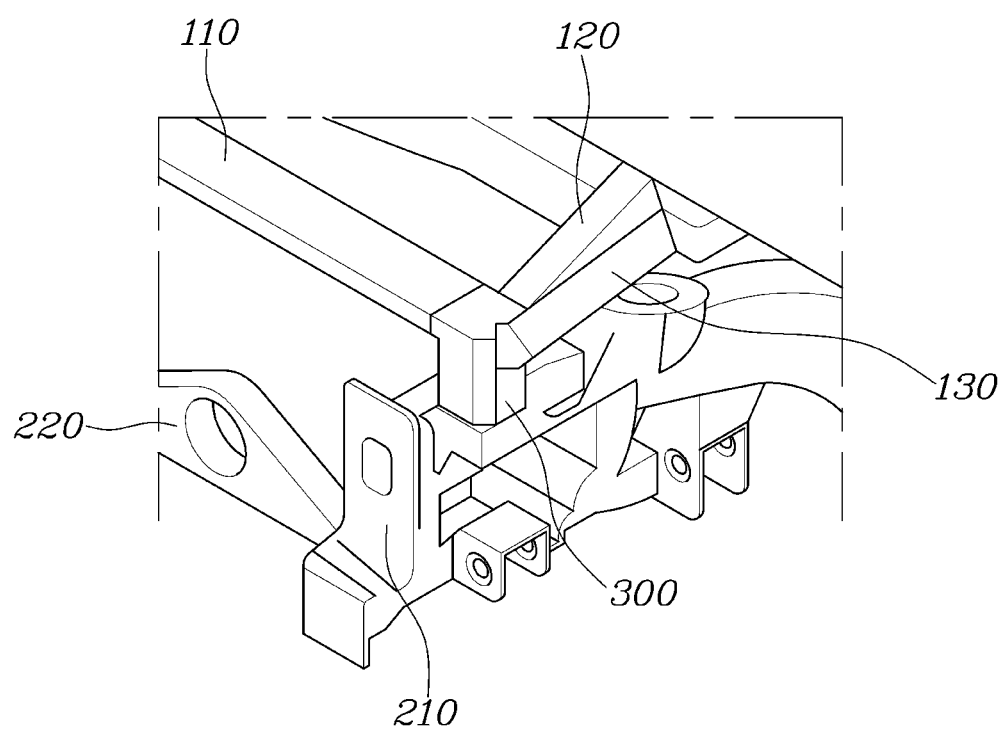
FIG. 2 is a view illustrating a connection joint configured to interconnect main members at a vehicle front according to an embodiment of the present disclosure.

Referring to FIG. 1, the vehicle frame assembly according to an embodiment may include a front cross member 110, a front side member 120, a fender member 130, a chassis frame 200, and a connection joint 300 (as shown in FIG. 2).

First, a cabin is a space in which a passenger or driver may sit. The cabin may be connected to the front cross member 110, the front side member 120, and the fender member 130 of the vehicle with a dash panel interposed therebetween. The front cross member 110 may be provided at the front of the cabin, may extend in a widthwise direction of the vehicle, and may have opposite ends each connected to the front side member 120 and the fender member 130, to be described later, through the connection joint 300.

The front side member 120 has one end portion connected to the front cross member 110 and has another end portion extending rearwards of the front cross member 110. The front side member 120 has a rear end fixed to the dash panel so as to transfer the load to the dash panel and the side frame upon frontal collision of the vehicle. In addition, the fender member 130 has one end portion connected to the front cross member 110 and has another end portion extending outwardly upwards of the vehicle. The fender member 130 has an end portion extending outwardly upwards of the vehicle and connected to a fender apron member, and the fender apron member has an upper portion to which an A-pillar member is connected. Here, the front cross member 110, the front side member 120, and the fender member 130 described above may all have closed cross-sections and be made of steel, thereby securing rigidity of the members.

Figure 3:
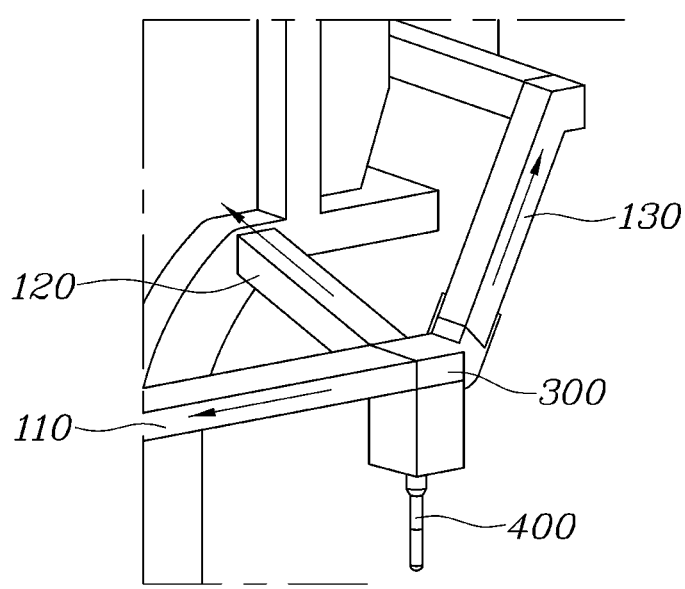
FIG. 3 is a view illustrating a path of load when an frontal collision of a vehicle occurs according to an embodiment of the present disclosure.

FIG. 3 is a view illustrating the path of load in an event of a frontal collision of a vehicle occurs according to an embodiment of the present disclosure.

Referring to FIG. 3, the front cross member 110, the front side member 120, and the fender member 130 are interconnected through the connection joint 300. Because the front cross member 110, the front side member 120, and the fender member 130 share a load path, upon frontal collision of the vehicle, the front impact force may be distributed to the front cross member 110, the front side member 120, and the fender member 130, respectively, and transmitted through the vehicle frame. Accordingly, the connectivity among the front cross member 110, the front side member 120, and the fender member 130 is increased through the connection joint 300, thereby securing the stability of the cabin upon frontal collision of the vehicle.

Hereinafter, the connection joint 300 configured to interconnect the front cross member 110, the front side member 120, and the fender member 130 are described in detail below.

FIG. 2 is a view illustrating the connection joint 300 configured to interconnect main members at a front part of the vehicle according to an embodiment of the present disclosure.

The connection joint 300 may be connected to an end portion of the front cross member 110, may have formed therein an inner space. The connection joint 300 may allow the front cross member 110, the front side member 120, and the fender member 130 to be interconnected in the inner space. The interconnection may be facilitated through single-sided coupling, and a coupling method is described below. The front side member 120 is positioned behind the connection joint 300, the fender member 130 is positioned outwardly of the vehicle, and the front cross member 110 is positioned inwardly of the vehicle so as to form a predetermined angle with one another. The connection joint 300 may be made of a lightweight material. The connection joint 300 made of a lightweight material is directly connected to the front cross member 110, the front side member 120, and the fender member 130, thereby increasing connectivity and improving the rigidity of the chassis frame 200. Because the connection joint 300 is made of a lightweight material, quality deviation caused by $CO_2$ welding performed in the related art is reduced, and additional components such as bulkheads are not needed.

The chassis frame 200 may be provided at a lower portion of the vehicle so as to support main members of the vehicle, the cabin, and the like at the lower portion of the vehicle. The vehicle has a middle end provided with a middle side member 100, and the chassis frame 200 may be connected to the connection joint 300 in the vertical direction. The chassis frame 200 may include a first frame 210 and a second frame 220. The first frame 210 may be a frame vertically connected to the connection joint 300 and extending to the lower portion of the vehicle, and the second frame 220 may be a frame connected to a lower end of the first frame 210 and extending in the widthwise direction of the vehicle at the lower portion of the vehicle.

Figure 4:
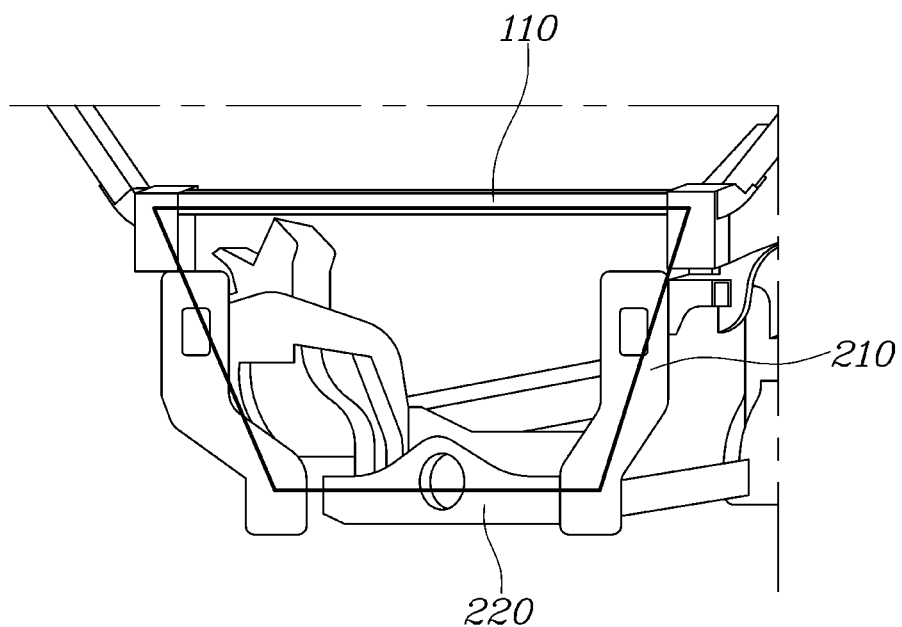
FIG. 4 is a view illustrating a first frame, a second frame, and a front cross member defining an annular structure at the front of a cabin according to an embodiment of the present disclosure.

FIG. 4 is a view illustrating the first frame 210, the second frame 220, and the front cross member 110 defining an annular structure at the front of the cabin according to an embodiment of the present disclosure.

Referring to FIG. 4, the first frame 210, the second frame 220, and the front cross member 110 may define an annular structure at the front of the cabin. The front cross member 110, the front side member 120, and the fender member 130 interconnected to one another through the connection joint 300 at the front of the cabin are connected to the chassis frame 200. In addition, the first frame 210, the second frame 220, and the front cross member 110 define an annular structure at the front of the vehicle, thereby improving lateral rigidity of the vehicle.

Here, the chassis frame 200 may be vertically connected to the front cross member 110, the front side member 120, and the fender member 130 through the joint connecting portion 400. The joint connecting portion 400 may extend downwards from the connection joint 300. The first frame 210 of the chassis frame 200 may be mechanically coupled to the connection joint 300 through the joint connecting portion 400. Because the first frame 210 and the joint connecting portion 400 are mechanically coupled to each other, it is advantageous in terms of quality. The joint connecting portion 400 has a structure to unify and strengthen coupling between the main members and the chassis frame 200 so as to efficiently distribute the load of the vehicle.

Figure 5:
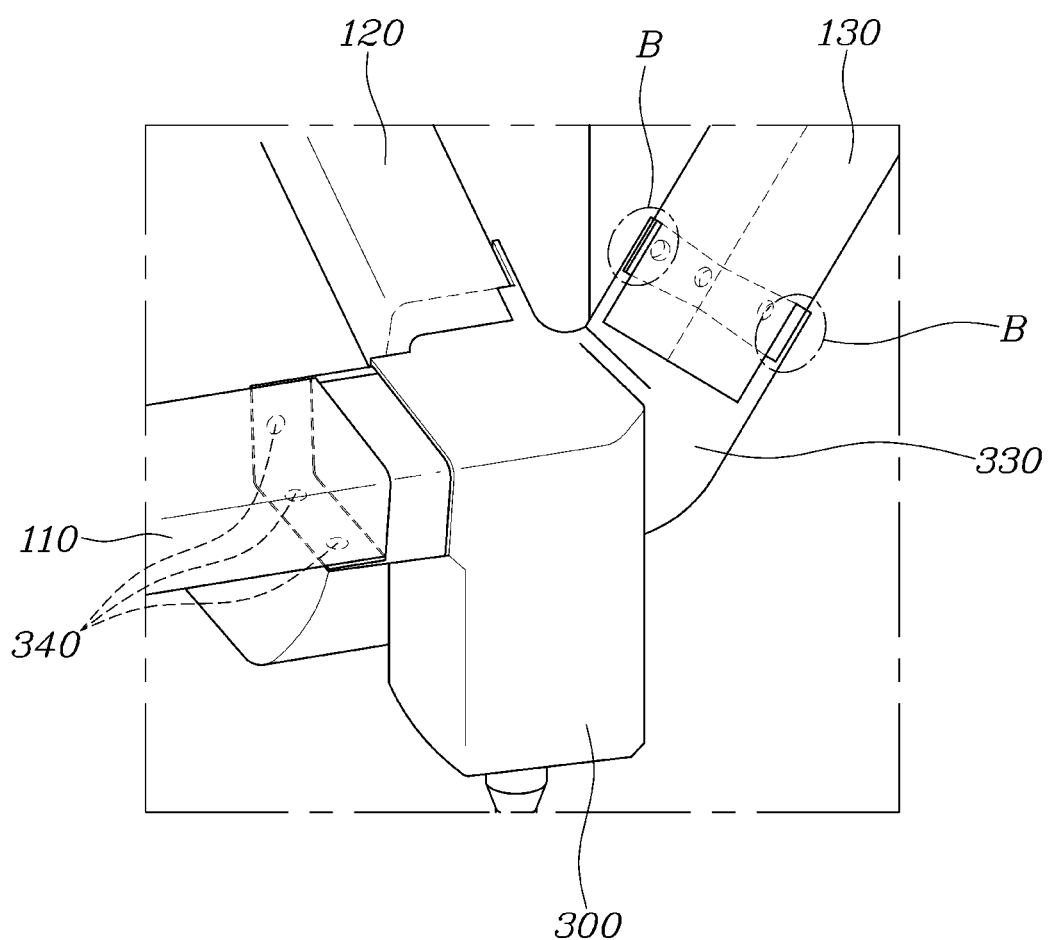
FIGS. 5 and 6 are views illustrating the shape of a coupling portion according to an embodiment of the present disclosure.
Figure 6:
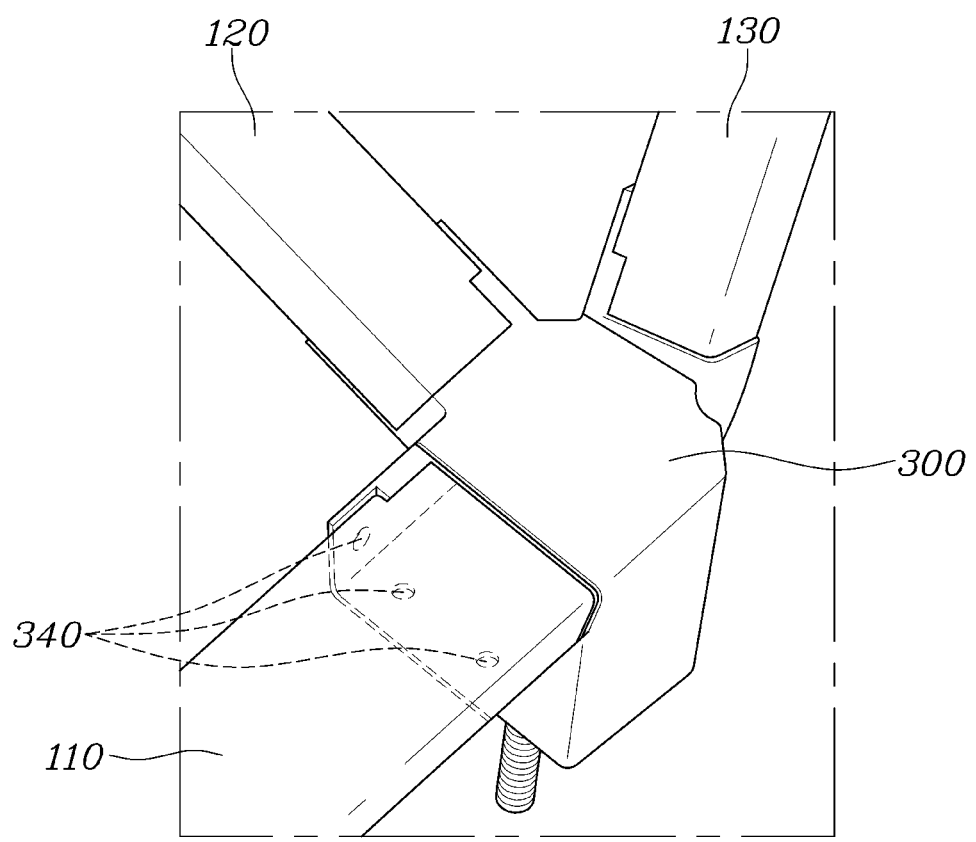

FIGS. 5 and 6 are views illustrating the shape of a coupling portion 330 according to an embodiment of the present disclosure.

Referring to FIGS. 5 and 6, the connection joint 300 has the coupling portion 330 extending towards the front cross member 110, the front side member 120, and the fender member 130, respectively, so as to be coupled to the members, respectively. In order to allow the front cross member 110, the front side member 120, and the fender member 130 to be easily coupled to the connection joint 300, the coupling portion 330 has a flange shape in the direction towards each of the members at the upper end of the connection joint 300. Here, the inner space of the connection joint 300 may have a closed cross-section, and the coupling portion 330 may have an open cross-section, having one open side and the open side facing upwards.

The coupling portion 330 extends in the direction towards each of the members, and is brought into contact with the side ends of the front cross member 110, the front side member 120, and the fender member 130, respectively, so as to be coupled to the front cross member 110, the front side member 120, and the fender member 130 while being in surface contact with the same. The coupling portion 330 may have formed therein a seating groove B so that the side ends of the front cross member 110, the front side member 120, and the fender member 130 are seated in the coupling portion 330. The front cross member 110, the front side member 120, and the fender member 130 all have closed cross-sections. More specifically, two surfaces of the front cross member 110, two surfaces of the front side member 120, and two surfaces of the fender member 130 are each brought into contact with the seating groove B in the coupling portion 330. The remaining two surfaces of the front cross member 110, the remaining two surfaces of the front side member 120, and the remaining two surfaces of the fender member 130 are each bolted to coupling holes 340 formed in the coupling portion 330 so as to be coupled thereto. Through such a coupling method between each member and the connection joint 300, assembly of the frame assembly is facilitated, and the rigidity of the members is further increased by the structure in which two surfaces are supported and the remaining two surfaces are seated.

Figure 7:
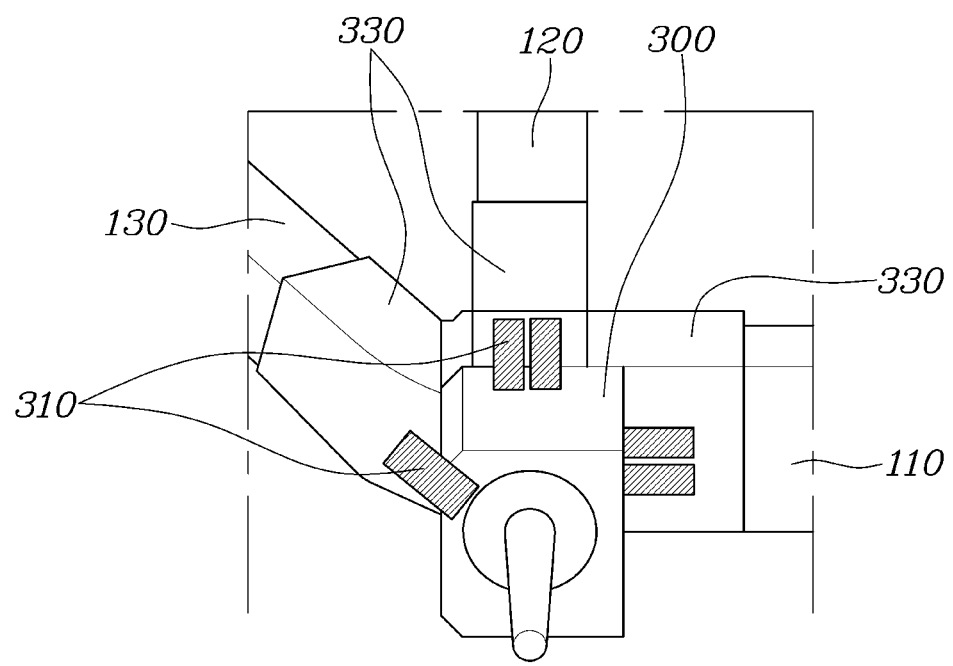
FIG. 7 is a view illustrating a reinforcing rib provided at the outer wall of a connection joint according to an embodiment of the present disclosure.

FIG. 7 is a view illustrating a reinforcing rib 310 provided at the outer wall of the connection joint 300 according to an embodiment of the present disclosure.

Referring to FIG. 7, the reinforcing rib 310 supports the coupling portion 330 at the outer wall of the connection joint 300. The reinforcing rib 310 may be provided in plural so as to support the coupling portion 330 in each direction where the front cross member 110, the front side member 120, and the fender member 130 are coupled to the connection joint 300. Through the reinforcing ribs 310, the front cross member 110, the front side member 120, and the fender member 130 may be supported and connection strength therebetween may be increased.

Figure 8:
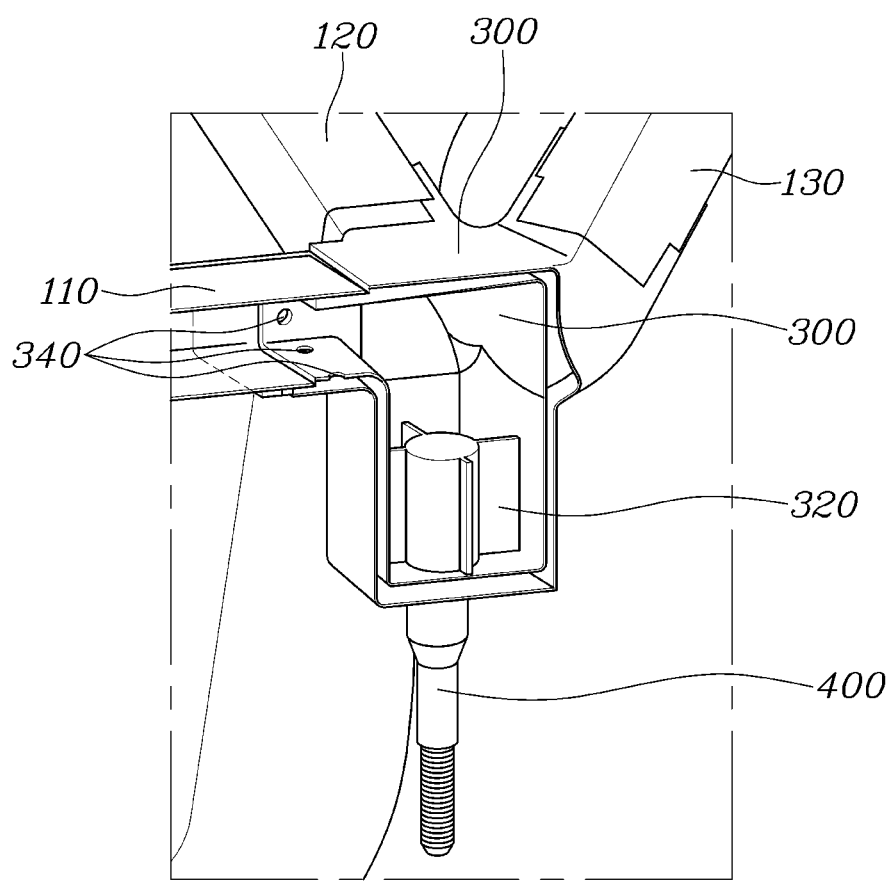
FIG. 8 is a view illustrating an inner rib provided in the inner space of a connection joint according to an embodiment of the present disclosure.

FIG. 8 is a view illustrating an inner rib 320 provided in the inner space of the connection joint 300 according to an embodiment of the present disclosure.

Referring to FIG. 8, the inner rib 320 may be vertically extended in the inner space of the connection joint 300 so as to be extended to a center. The inner rib 320 may have a cross shape and extend downwards in the connection joint 300. Accordingly, coupling rigidity of the joint connecting portion 400 may be improved, and mechanical coupling stiffness between the chassis frame 200 and the connected frame may be further increased.

As is apparent from the above description, the present disclosure provides a vehicle frame assembly having a structure provided with a connection joint configured to interconnect a front cross member, a front side member, and a fender member to one another so as to improve connectivity between a chassis frame and each of the members provided at the lower portion of the vehicle, thereby increasing the rigidity of the chassis frame and each of the members.

The effect obtained by the present disclosure is not limited to the effect mentioned above, and other effects not mentioned herein should be clearly understood by those having ordinary skill in the art based on the above description.

Although the embodiments of the present disclosure have been disclosed for illustrative purposes, those having ordinary skill in the art should appreciate that various modifications, additions, and substitutions are possible, without departing from the scope and spirit of the present disclosure.

What is claimed is:

1. A vehicle frame assembly comprising:
a front cross member provided at a front of a cabin and extending in a widthwise direction of a vehicle;
a front side member including a first end portion connected to the front cross member and a second end portion extending rearwards of the front cross member;
a fender member including a first end portion connected to the front cross member and a second end portion extending outwardly upwards of the vehicle; and
a connection joint connected to an end portion of the front cross member and configured to form an inner space therein, the connection joint configured to allow the front cross member, the front side member, and the fender member to be interconnected in the inner space.

2. The vehicle frame assembly according to claim 1, further comprising a chassis frame provided at a lower portion of the vehicle and connected to the connection joint in a vertical direction of the vehicle so as to support the lower portion of the vehicle.

3. The vehicle frame assembly according to claim 2, wherein the connection joint includes a joint connecting portion downwardly extending therefrom, and the joint connecting portion interconnects the connection joint and the chassis frame in the vertical direction.

4. The vehicle frame assembly according to claim 3, wherein the chassis frame is mechanically coupled to the connection joint through the joint connecting portion.

5. The vehicle frame assembly according to claim 2, wherein the chassis frame comprises: a first frame vertically connected to the connection joint and extending to the lower portion of the vehicle, and a second frame connected to a lower end of the first frame and extending in the widthwise direction of the vehicle at the lower portion of the vehicle.

6. The vehicle frame assembly according to claim 5, wherein the first frame, the second frame, and the front cross member define an annular structure at the front of the cabin.

7. The vehicle frame assembly according to claim 1, wherein the inner space of the connection joint has an inner surface provided with an inner rib, fixed thereto and extending to a center.

8. The vehicle frame assembly according to claim 7, wherein the inner rib has a cross shape extending vertically in the inner space of the connection joint.

9. The vehicle frame assembly according to claim 1, wherein the front cross member, the front side member, and the fender member are interconnected through the connection joint and share a load path when a frontal collision of the vehicle occurs.

10. The vehicle frame assembly according to claim 1, wherein the connection joint includes a coupling portion extending to and coupled with the front cross member, the front side member, and the fender member, respectively.

11. The vehicle frame assembly according to claim 10, wherein the inner space of the connection joint has a closed cross-section, and the coupling portion has an open cross-section, having one open side and the open side facing upwards.

12. The vehicle frame assembly according to claim 10, wherein the coupling portion is brought into contact with a side end of the front cross member, a side end of the front side member, and a side end of the fender member, and the coupling portion is formed therein a seating groove so that the side ends are seated in the coupling portion.

13. The vehicle frame assembly according to claim 10, wherein the front cross member, the front side member, and the fender member each include an end portion coupled to a coupling hole formed in the coupling portion.

14. The vehicle frame assembly according to claim 10, further comprising a plurality of reinforcing ribs, provided on an outer wall of the connection joint and configured to support the coupling portion in each direction where the front cross member, the front side member, and the fender member are coupled to the connection joint.

* * * * *